(12) United States Patent
Williams (10) Patent No.: US 9,875,355 B1
(45) Date of Patent: Jan. 23, 2018

(54) DNS QUERY ANALYSIS FOR DETECTION OF MALICIOUS SOFTWARE

(71) Applicant: Amazon Technologies, Inc., Reno, NV (US)

(72) Inventor: Sean Reese Williams, Rancho Cucamonga, CA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/029,608

(22) Filed: Sep. 17, 2013

(51) Int. Cl.
*H04L 29/06* (2006.01)
*G06F 21/56* (2013.01)

(52) U.S. Cl.
CPC .......... *G06F 21/56* (2013.01); *H04L 63/1408* (2013.01); *H04L 2463/144* (2013.01)

(58) Field of Classification Search
CPC .......... H04L 63/14–63/1441; H04L 2463/144; G06F 21/56
USPC ............................................................. 726/23
See application file for complete search history.

(56) References Cited

U.S. PATENT DOCUMENTS

| | | | |
|---|---|---|---|
| 7,127,743 B1* | 10/2006 | Khanolkar | G06F 21/552 709/223 |
| 8,204,984 B1* | 6/2012 | Aziz et al. | 709/224 |
| 8,260,914 B1* | 9/2012 | Ranjan | H04L 61/1511 709/224 |
| 8,516,585 B2* | 8/2013 | Cao et al. | 726/23 |
| 8,726,391 B1* | 5/2014 | Zhong et al. | 726/25 |
| 9,245,121 B1* | 1/2016 | Luo | G06F 21/56 |
| 2010/0103837 A1* | 4/2010 | Jungck | H04L 29/12066 370/252 |
| 2010/0154032 A1* | 6/2010 | Ollmann | G06F 21/552 726/3 |
| 2012/0084860 A1* | 4/2012 | Cao | H04L 63/1441 726/23 |
| 2013/0031625 A1* | 1/2013 | Lim | G06F 21/552 726/22 |

(Continued)

OTHER PUBLICATIONS

Dietrich, et.al, On Botnets that use DNS for Command and Control. 2011 Seventh European Conference on Computer Network Defense [online]. © 2012 IEEE [retrieved on Nov. 3, 2016]. Retrieved from the internet<URL: http://ieeexplore.ieee.org/stamp/stamp.jsp?arnumber=6377756>.*

(Continued)

*Primary Examiner* — Minh Dinh
(74) *Attorney, Agent, or Firm* — Klarquist Sparkman, LLP (57) ABSTRACT

A method and system are disclosed for detecting malicious software on host server computers or instances running on the host server computers. A pattern of behavior of how the malicious software makes Domain Name System (DNS) requests and/or responses can be used to detect the malicious software. The pattern of behavior can be based on actions that the tenants take in order to make the DNS requests, such as repeating the same requests at fixed time intervals, or requesting a plurality of DNS requests in batches, wherein at least a threshold percentage of which are not resolvable, or using statistically random domain names with the requests. The pattern of behavior can also be associated with responses to the DNS requests, such as when the response includes a text message, and the text message includes encrypted or statistically random data.

18 Claims, 11 Drawing Sheets

(56) References Cited

U.S. PATENT DOCUMENTS

| | | | |
|---|---|---|---|
| 2013/0074181 A1* | 3/2013 | Singh | H04L 41/0668 726/22 |
| 2013/0191915 A1* | 7/2013 | Antonakakis | H04L 63/14 726/23 |
| 2014/0230054 A1* | 8/2014 | Dinerstein et al. | 726/22 |

OTHER PUBLICATIONS

Constantin, "Lack of Abuse Detection Allows Cloud Computing Instances to be Used Like Botnets, Study Says," Oct. 30, 2012, 4 pages.

Waldecker, "A Review on IRC Botnet Detection and Defence," *Kaspersky IT Security for the Next Generation-European Cup*, 2011, 9 pages.

"Botnet," *Wikipedia, the free encyclopedia*, http://en.wikipedia.org/wiki/Botnet, downloaded Sep. 17, 2013, 13 pages.

* cited by examiner

DNS QUERY ANALYSIS FOR DETECTION OF MALICIOUS SOFTWARE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Network security is important in a cloud environment, particularly the ability to effectively protect and maintain stable computers and systems. If certain types of malicious software can infect a host computer, it may also be able to perform any number of hostile actions, such as sending out malicious emails from the host computer, stealing sensitive data, and assisting with distributed denial of service attacks. One particular form of malicious software is known as botnets.

Botnets are illicit networks built from a large number of compromised servers and/or personal computers. Botnets can include thousands of so-called zombie computers, which are computers infected by malware and which carry out commands on behalf of the botnet operator. These compromised computers can bombard web servers with denial-of-service attacks and participate in other online cracking activities, such as password cracking.

E-criminals use command-and-control software to coordinate zombie attack execution. Command-and-control frequently operates from compromised servers, without the server owner's knowledge. A botnet's originator (known as a "bot herder" or "bot master") can control the group remotely and often for criminal purposes. This server is known as the command-and-control (C&C) server. The e-criminals demand a constant stream of freshly compromised servers to keep botnets running. If a botnet is able to place command-and-control software on a virtual machine that later is duplicated through cloning, the botnet capacity will automatically grow. For stakeholders in cloud hosting environments, the implication is a higher expectation of being targeted for server takeovers and botnet command-and-control insertions.

Thus, there is a need for tools that combat tactics that allow malicious operators to exploit networked computers.

DETAILED DESCRIPTION

A method and system are disclosed for detecting malicious software on host server computers or instances running on the host server computers. A pattern of behavior of how the malicious software makes Domain Name System (DNS) requests and/or responses can be used to detect the malicious software. The pattern of behavior can be based on actions that the tenants take in order to make the DNS requests, such as repeating the same requests at fixed time intervals, or requesting a plurality of DNS requests in batches, wherein at least a threshold percentage of which are not resolvable, or using statistically random domain names with the requests. The pattern of behavior can also be associated with responses to the DNS requests, such as when the response includes a text message, and the text message includes encrypted or statistically random data. Thus, the pattern of behavior can be independent of whether a domain name is on a blacklist of known malicious command and control servers. Detection can include central malicious command-and-control communications, which can be extended to peer-to-peer communications. As described further below, a variety of techniques can be used to obtain the DNS request/response traffic. For example, it can be packet mirrored, pulled from shared caches, pulled from a database, etc. The method of analyzing the DNS request/response traffic can occur in real-time or using batch processing. The DNS traffic analysis can include correlating lookups across customers or across customer instances. Identifying a pattern of behavior can include a name lookup frequency, statistical probability of randomness, and anomalous lookup signatures. Other patterns can also be used. For example, once a malicious host is detected, its historical data can be analyzed and used to compare against other hosts. A confidence level output can be generated indicating a likelihood that malicious software has been detected.

Figure 1:
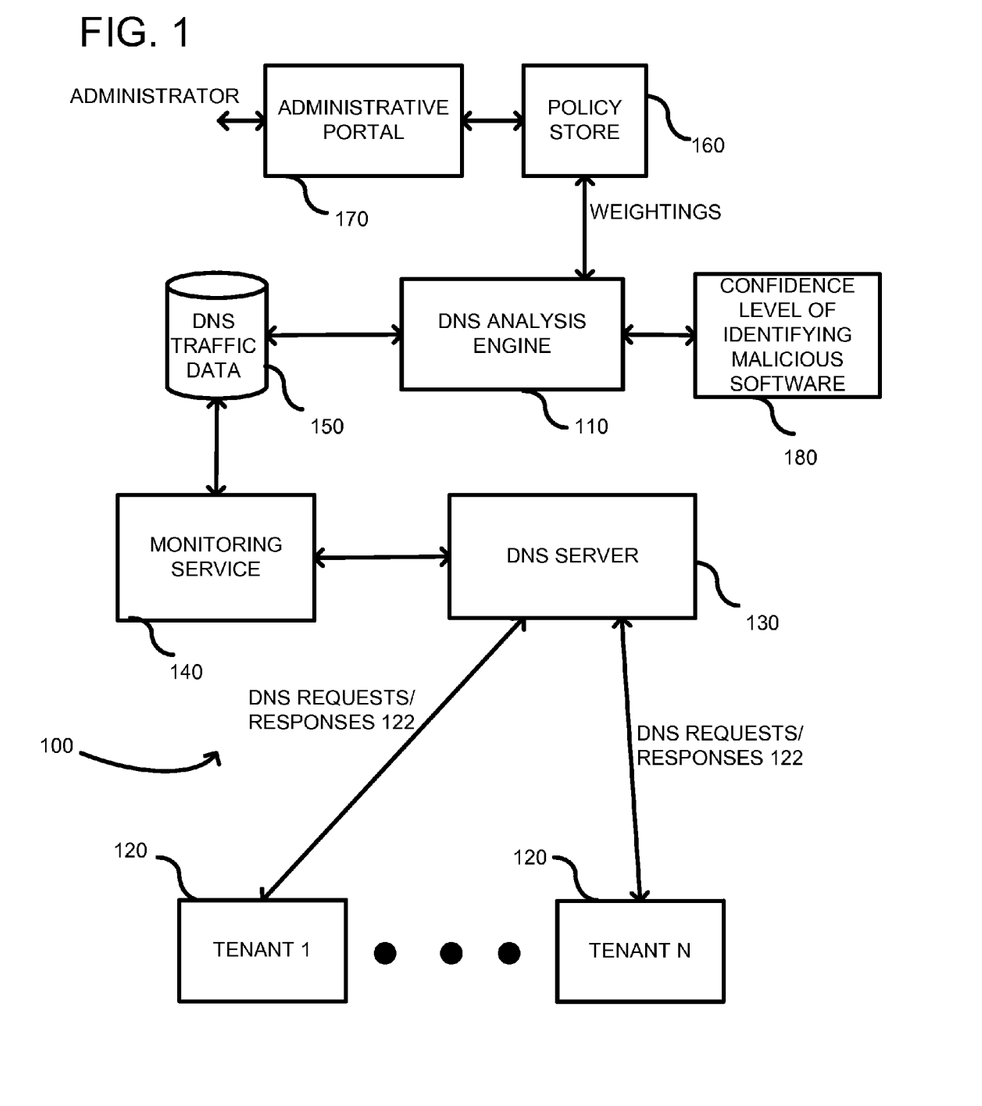
FIG. 1 is an example system in a multi-tenant environment wherein a DNS-analysis engine can be used to detect malicious software running on tenant instances, wherein a monitoring service retrieves DNS traffic data from a DNS server.

FIG. 1 is an example system 100 in a multi-tenant environment wherein a DNS-analysis engine 110 can be used to detect malicious software running on tenant instances 120. The tenant instances 120 (1-N, where N is any integer value) can be executing on a plurality of host server computers. The tenants 120 can be have malicious software executing thereon which can make DNS requests and receive responses as indicated at 122. Generally, the DNS request includes a domain name and the response includes an IP address. Other fields can also be used in the requests and responses. For example, responses can include text data in any desired format in a text field, which is well understood in the art. The DNS requests 122 can be made to a DNS server 130, which translates domain names to the numerical IP addresses needed for the purpose of locating computer services and devices worldwide. In the case where the tenants 120 have been infiltrated by malicious software, the DNS requests 122 can be made in an attempt to contact a command-and-control server. However, such DNS requests can have a common pattern of behavior that is detectable. The patterns of behavior can include such things that are independent of the domain name lookup, such as how frequently a name lookup is requested, or a percentage of name lookup requests that are not resolvable. Other patterns of behavior can also be used, such as using domain names that are statistically random. A monitoring service 140 can receive the DNS requests and/or responses in real time or in batches at spaced intervals directly from the DNS server 130. The monitoring service 140 can store the DNS traffic data in a database 150. The DNS-analysis engine 110 can obtain the DNS traffic data through a read operation of the data base 150. As further described below, the DNS-analysis engine 110 can identify common patterns in the DNS requests that increase a probability that the requests are received from malicious software. Weighting parameters can be input into the engine 110 through a policy store 160. The policy store 160 can be controlled by an administrator through an administrative portal 170. The weighting parameters can selectively tune how the engine 110 generates results of the analysis. The weightings can, for example, modify an interpretation of whether something is statistically random, such as how numbers placed throughout a domain are treated, which countries are more heavily weighted in a top-level domain, etc. The engine 110 can output a confidence level 180 identifying a probability that malicious software was detected. The confidence level 180 can ultimately be consumed by the tenants so as to take corrective action in addressing the malicious software.

Although FIG. 1 shows multiple tenants, it can be a single tenant with multiple virtual machines and the different virtual machines can make DNS requests. A common pattern in the DNS requests of the virtual machines can be made. Thus, the embodiments described herein are not limited to a multi-tenant environment.

Figure 2:
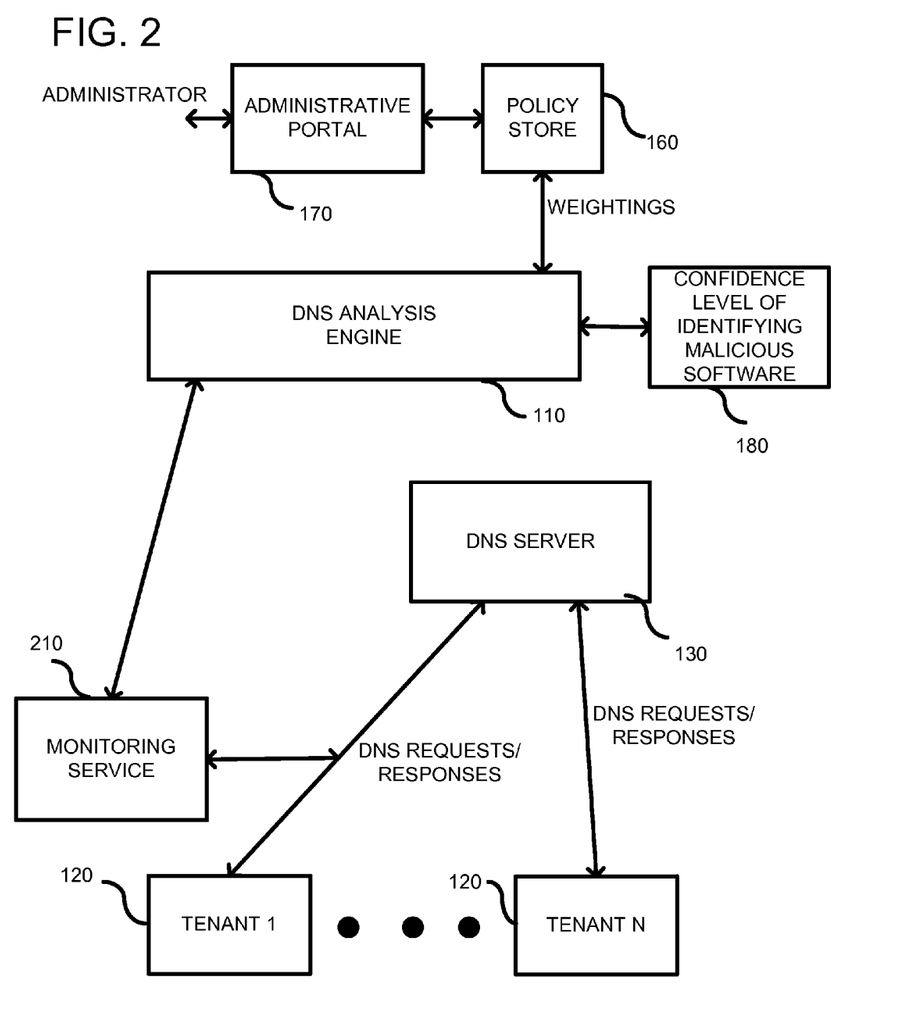
FIG. 2 is an example system according to another embodiment, wherein the monitoring service passively receives the DNS traffic data.

FIG. 2 is an alternative embodiment, similar to the embodiment shown in FIG. 1. However, a monitoring service 210 monitors the DNS requests and responses through mirroring and passes the same to the engine 110. Alternatively, the monitoring service can place the data in a database for later use by the engine 110. As described further below, port mirroring can be implemented by replication technology that sends packets to the DNS server and, simultaneously, to the monitoring service. Other techniques can be used. Using the structure of FIG. 2, the extraction of DNS requests and/or responses can be transparent to the DNS server 130. The DNS-analysis engine can retrieve the DNS requests and/or responses from the monitoring service 210 or the monitoring service 210 can push such data to the engine 110. Once the requests are received by engine 110, it can search through the data for a common pattern of behavior across multiple of the tenants 120. The pattern of behavior can be associated with actions of malicious software on the tenants 120 or responses made by the DNS server 130. When multiple tenants 120 exhibit a common pattern of behavior, a heightened likelihood exists that malicious software is present on the tenants.

Figure 3:
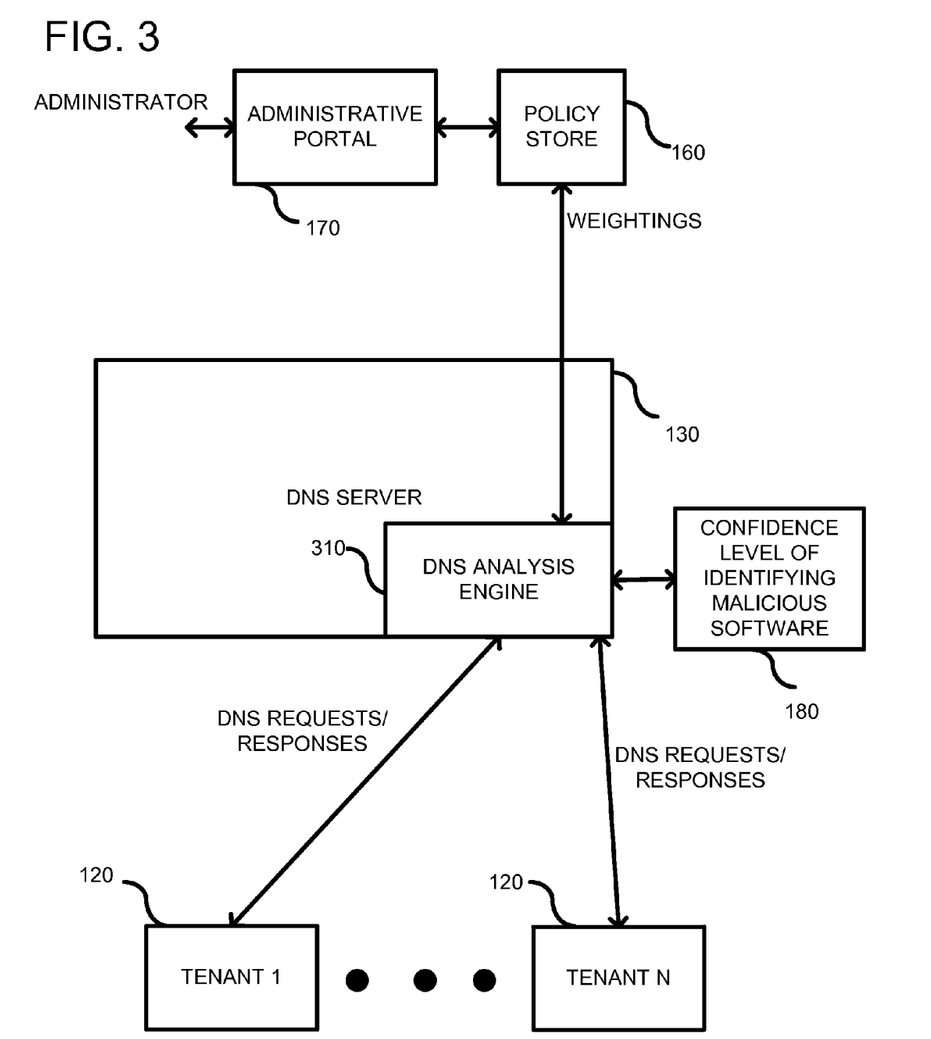
FIG. 3 is an example system according to another embodiment, wherein the DNS-analysis engine is running on a DNS server.

FIG. 3 is yet another embodiment, wherein a DNS-analysis engine 310 is executing on a DNS server 130. In this case, the engine 310 can have direct access to the DNS request and/or response traffic data. For example, the engine 310 can have a shared cache with a portion of the DNS server that is responding to requests. In such a case, a separate database is not needed. Nonetheless, the engine 310 can identify a common pattern of behavior of the DNS requests across multiple of the tenants 120 in order to detect malicious software. The policy store 160 can be accessed directly from the engine 310 in a manner similar to FIGS. 1 and 2 in order to receive weighting information used in determining whether a common pattern of behavior is present.

Figure 4:
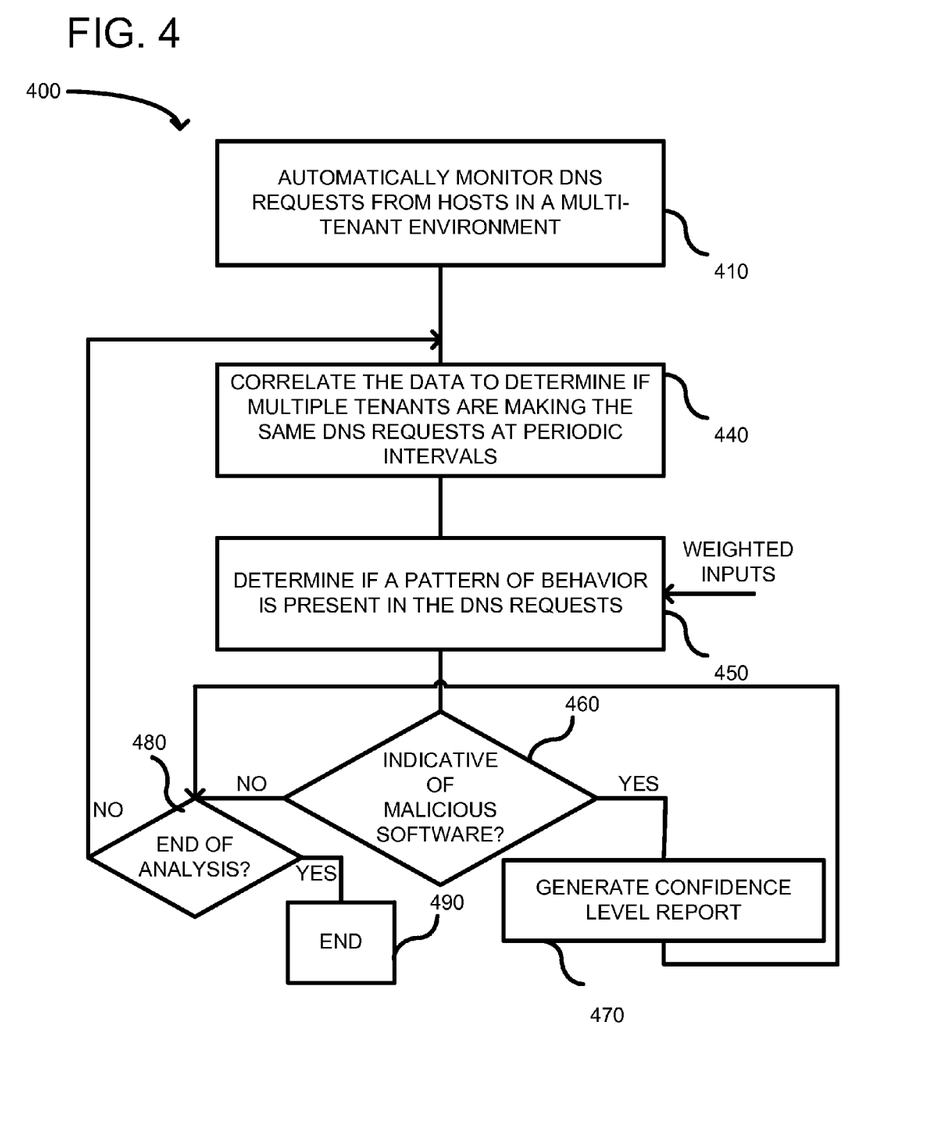
FIG. 4 is a flowchart of a method for generating a confidence level report indicating whether malicious software is detected.

FIG. 4 is a flowchart 400 of a method according to one embodiment that can be used in detecting malicious software. In process block 410, DNS requests can be automatically monitored. Automatic monitoring can be carried out by the monitoring service that passively monitors by routinely contacting a DNS server in order to obtain the DNS traffic data (such as shown at 140 in FIG. 1). Alternatively, the monitoring service can actively monitor the DNS traffic data through port mirroring, as indicated at 210 in FIG. 2. In yet another embodiment, the monitoring service is not needed as the requests can be directly monitored by the DNS-analysis engine, such as shown in the embodiment of FIG. 3. Thus, depending on the particular embodiment, it can be desirable to log the DNS traffic data and periodically retrieve the logged data. In process block 440, the data can be correlated to determine if multiple tenants are making the same DNS requests at periodic intervals. Correlation means that two tenants are performing the same or similar lookups and/or at the same or similar frequency. In process block 450, for correlated DNS traffic data, a determination can be made if a pattern of behavior is present the DNS traffic data. The pattern of behavior can include analyzing each domain name for a statistical probability that the name itself is randomly generated or analyzing that the pattern includes a threshold percentage of DNS requests that are unresolved. Thus, the pattern of behavior can be determined over a number of DNS requests. Weighted information can be used to control how the determination is calculated. For example, the weighted information can control an importance of having numbers embedded in a domain name, or an importance of a high-level domain of a certain type or a certain country. In decision block 460, if the determined pattern of behavior is indicative of malicious software, then at process block 470, a confidence report is generated indicating that malicious software was detected and a percentage likelihood that the detection is malicious software. The higher the probability that the domain name is statistically random, the higher percentage likelihood that the detection is malicious software. Additionally, the higher number of unresolved domain name lookups, the higher the percentage likelihood that the detection is malicious software. A threshold number can be used such that if the number is exceeded, then the malicious software is deemed detected. For example, an algorithm such as the following can be used: (weight 1)(probability of statistically random domain name)+(weight2)(percentage of unresolved lookups)>threshold. The confidence report can use such an algorithm in order to increase or decrease the likelihood of the detection. If decision block 460 is determined in the negative, then at decision block 480, a determination is made whether all of the data has been analyzed. If yes, then the method ends in process block 490. Otherwise, further data can be correlated to find other evidence of malicious software. Once the confidence report is generated at 470, a check can be made at 480 to determine if the analysis is complete. If not, the confidence report can be continuously updated until the analysis has ended at 490.

Figure 5:
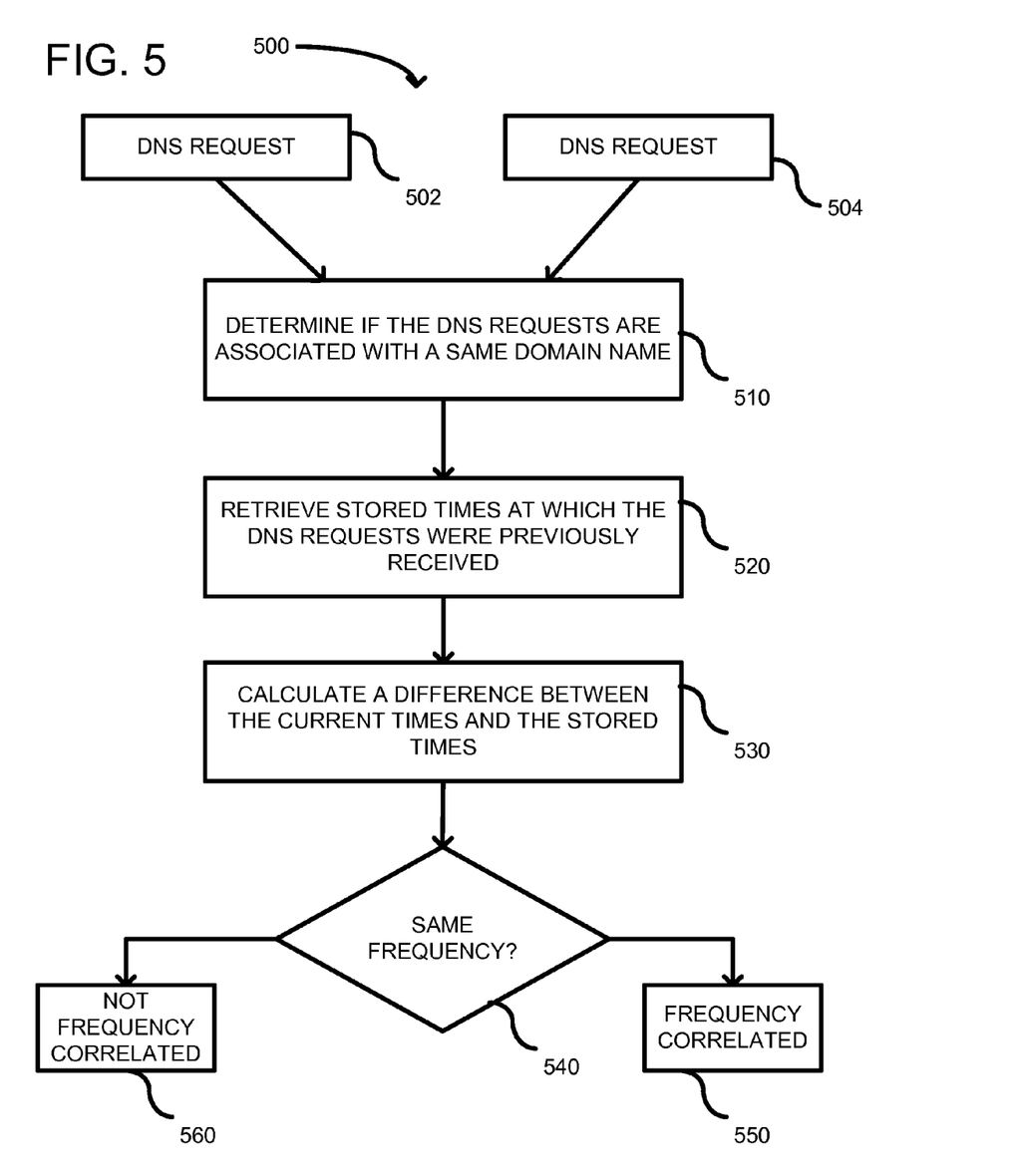
FIG. 5 is a flowchart of a method for detecting frequency correlation of DNS requests.

FIG. 5 is a flowchart 500 of a method for detecting frequency correlation of DNS requests, which can be used to correlate data as indicated in process block 440 of FIG. 4. Two different DNS requests are shown at 502, 504. In process block 510, a determination can be made whether the DNS requests are associated with a same domain name. For example, a simple comparison between the domain names can be made and, if a match is found, then the process continues. In process block 520, previously stored time-stamp data (e.g., day, hour, minute) can be retrieved indicating a last time that the same DNS requests were made. Thus, different time stamps can be retrieved associated with previous requests that correspond with DNS requests 502, 504. In process block 530, a difference can be calculated between the current time-stamp data and the previously stored time-stamp data for each DNS request to determine a frequency. In decision block 540, a check is made to determine if the frequencies are equal. If so, then the DNS requests 502, 504 are frequency correlated (process block 550). If not, then the DNS requests are not frequency correlated (process block 560).

Figure 6:
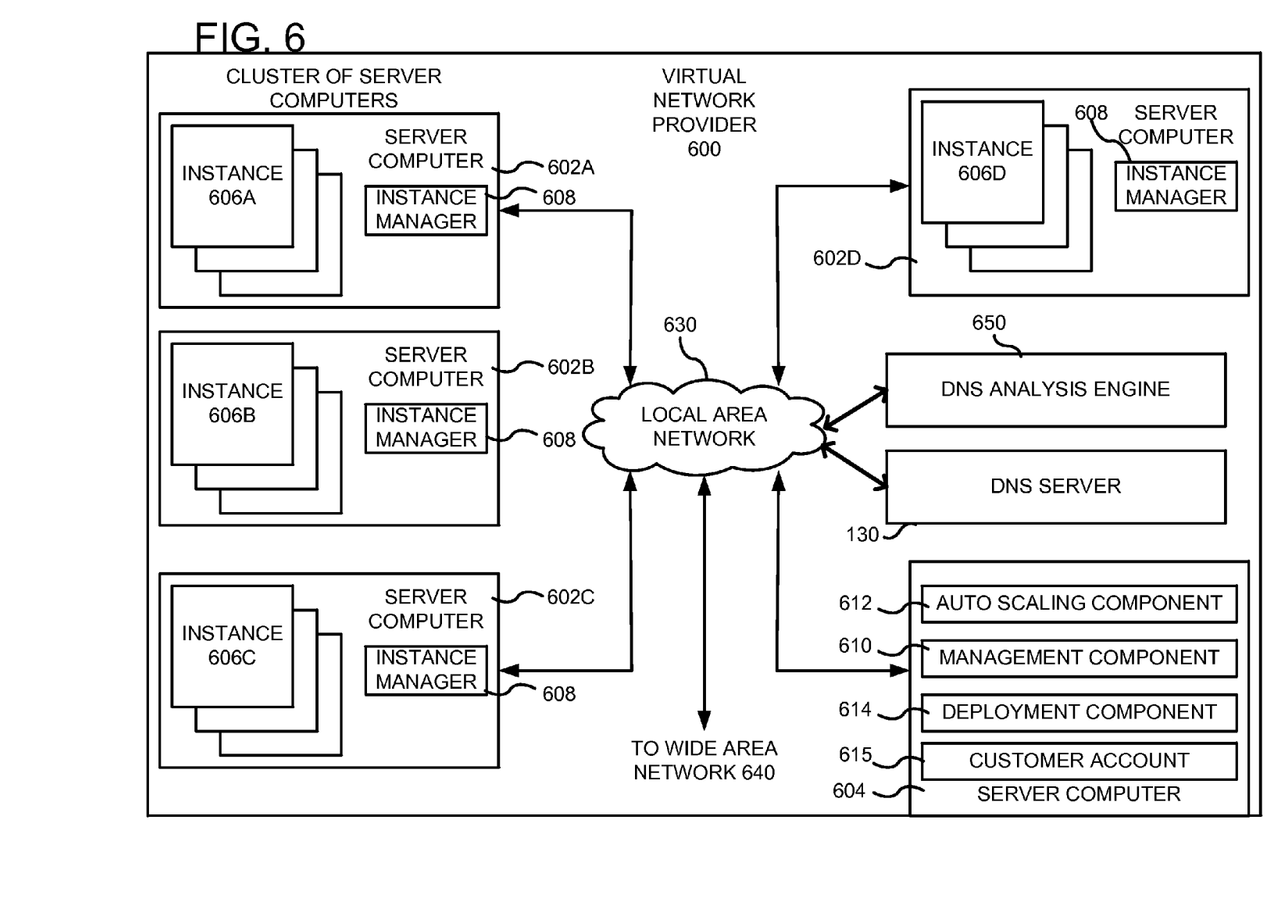
FIG. 6 is an example system diagram showing a plurality of virtual machine instances running in the multi-tenant environment.

FIG. 6 is a computing system diagram of a network-based virtual network provider 600 that illustrates one environment in which embodiments described herein can be used. By way of background, the virtual network provider 600 (i.e., the cloud provider) is capable of delivery of computing and storage capacity as a service to a community of end recipients. In an example embodiment, the virtual network provider can be established for an organization by or on behalf of the organization. That is, the virtual network provider 600 may offer a "private cloud environment." In another embodiment, the virtual network provider 600 supports a multi-tenant environment, wherein a plurality of customers operate independently (i.e., a public cloud environment). Generally speaking, the virtual network provider 600 can provide the following models: Infrastructure as a Service ("IaaS"), Platform as a Service ("PaaS"), and/or Software as a Service ("SaaS"). Other models can be provided. For the IaaS model, the virtual network provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. In some embodiments, end users access the virtual network provider 600 using networked client devices, such as desktop computers, laptops, tablets, smartphones, etc. running web browsers or other lightweight client applications. Those skilled in the art will recognize that the virtual network provider 600 can be described as a "cloud" environment.

The particular illustrated virtual network provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute an instance manager 608 capable of executing the instances. The instance manager 608 can be a hypervisor or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the virtual network provider 600. It should be appreciated that the network topology illustrated in FIG. 6 has been simplified and that many more networks and networking devices can be utilized to interconnect the various computing systems disclosed herein.

A DNS-analysis engine 650 can be connected through the local area network 630 to the DNS server 130, one or more server computers 604, server computers 602, or other server computers (not shown.) DNS requests made from the various server computers 602 can be received by the DNS server 130. The DNS requests traffic data can be obtained by the engine 650 through requests made to the DNS server 130 or an associated database. Alternatively, replication technology, such as port mirroring can be used to transparently transmit packets associated with the DNS request traffic data to the DNS server, while generating mirrored packets sent to engine 650. The replication technology can be implemented in any routing device between the source host servers and the DNS server 130. The mirrored packets can be received by the engine 650 directly or stored in a database that is readable by the engine.

Figure 7:
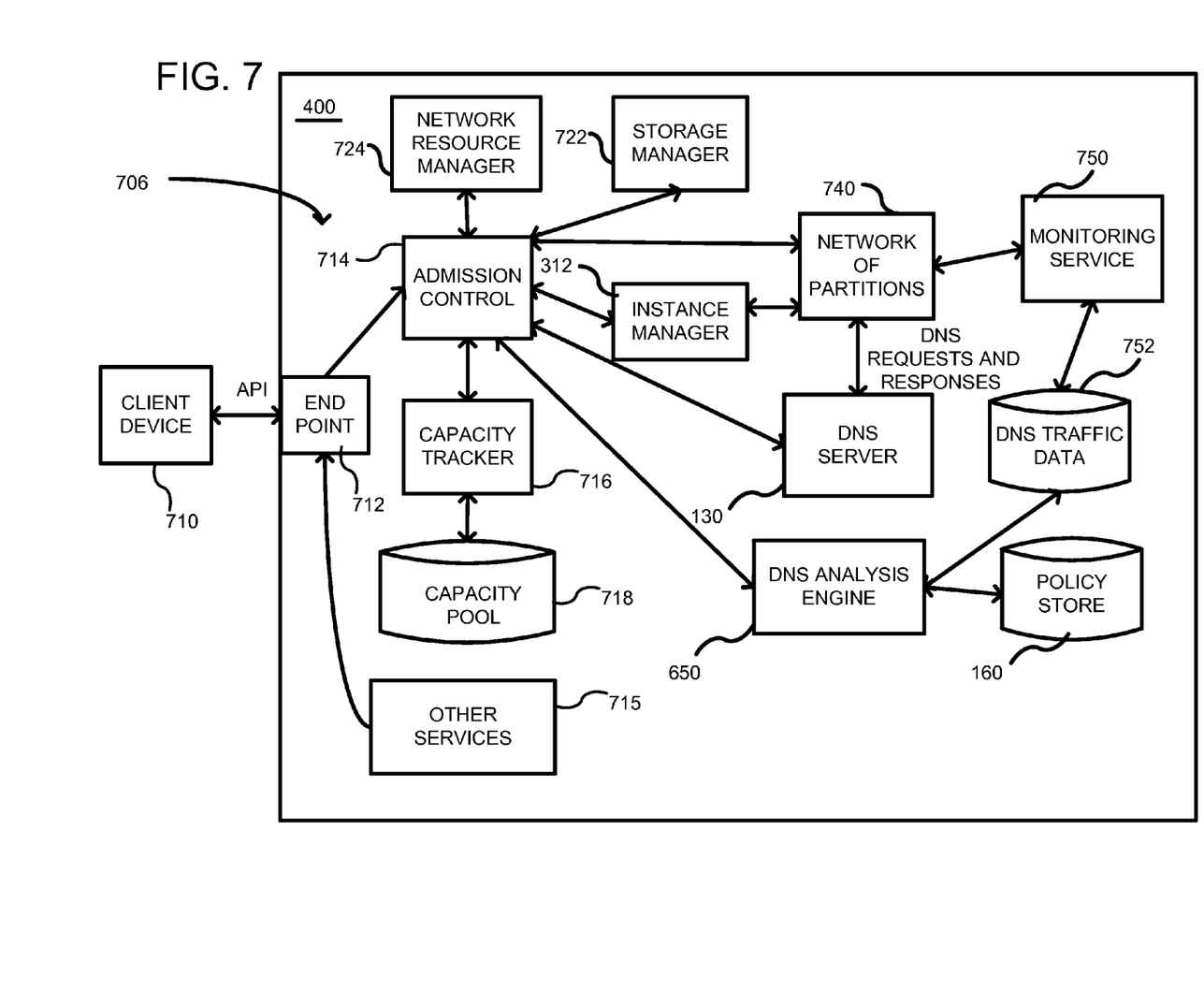
FIG. 7 shows further details of an example system including a plurality of management components associated with a control plane, wherein the DNS-analysis engine can access DNS traffic data received from a plurality of host server computers and/or instances.

FIG. 7 illustrates in further detail management components 706 that can be used in the multi-tenant environment of the virtual provider network 600. In order to access and utilize instances (such as instances 606 of FIG. 6), a client device can be used. The client device 710 can be any of a variety of computing devices, mobile or otherwise including a cell phone, smartphone, handheld computer, Personal Digital Assistant (PDA), desktop computer, etc. The client device 710 can communicate with the virtual provider network 600 through an end point 712, which can be a DNS address designed to receive and process API requests. In particular, the end point 712 can be a web server configured to expose an API. Other services 715, which can be internal to the virtual network provider 600, can likewise make API requests to the end point 712.

Other general management services that may or may not be included in the virtual network provider 600 include an admission control 714, e.g., one or more computers operating together as an admission control web service. The admission control 714 can authenticate, validate and unpack the API requests for service or storage of data within the virtual network provider 400. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. The instance manager 720 controls launching and termination of instances in the network. When an instruction is received (such as through an API request) to launch an instance, the instance manager pulls resources from the capacity pool 718 and launches the instance on a decided upon host server computer. Similar to the instance manager are the storage manager 722 and the network resource manager 724. The storage manager 722 relates to initiation and termination of storage volumes, while the network resource manager 724 relates to initiation and termination of routers, switches, subnets, etc. A network of partitions 740 is described further in relation to FIG. 8 and includes a physical layer upon which the instances are launched. DNS requests can be made from those instances and/or host server computers that are within the network of partitions 740. The DNS requests can be received by the DNS server 130, which can perform IP address lookups associated with domain names received with the requests. The IP addresses can be returned as responses from the DNS server 130 to the network of partitions 740. The monitoring service 750 can receive mirrored packets of the DNS requests so that the monitoring service can monitor the DNS traffic data and store it in the database 752. Thus, it is within the network of partitions 740 where the malicious software can reside. The DNS-analysis engine 650 can analyze the stored DNS traffic data using the methods described herein in order to detect malicious software running in the network of partitions 740. The policy store 160 can be used to control how the engine 650 performs its analysis of whether a DNS request is from malicious software.

It should be noted that the detailed implementation of FIG. 7 is a particular embodiment of FIG. 2. The detailed components of FIG. 7 can also be utilized for FIGS. 1 and 3. For example, for the FIG. 1 embodiment, the monitoring service can be coupled directly to the DNS server. For the FIG. 3 embodiment, the monitoring service can be incorporated into the DNS server.

Figure 8:
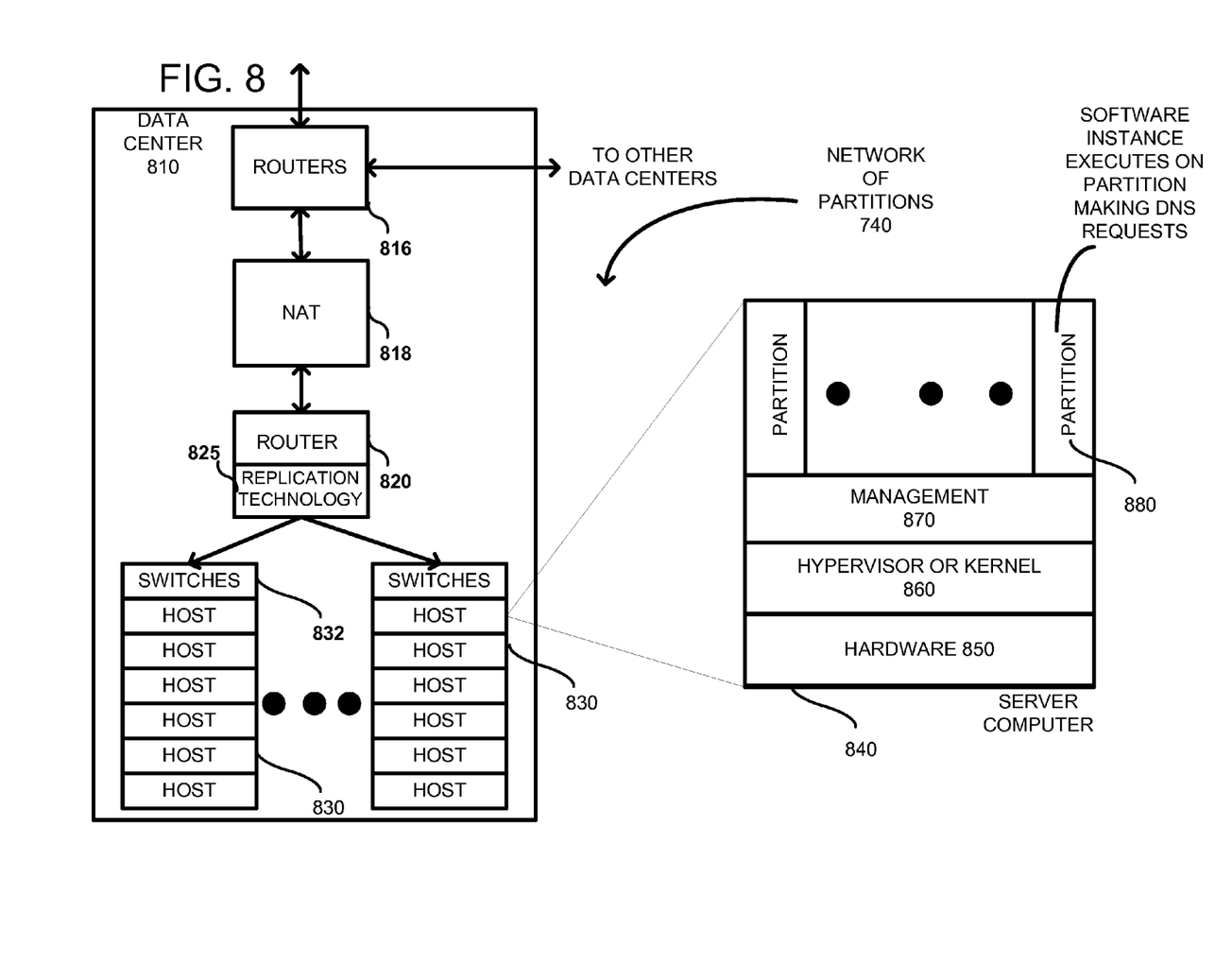
FIG. 8 shows an example of a plurality of host computers, routers and switches, which are hardware assets used for running the virtual machine instances, and which can transmit DSN requests and receive DNS responses as described herein.

FIG. 8 illustrates the network of partitions 740 and the physical hardware associated therewith. The network of partitions 740 can include a plurality of data centers, such as data center 810, coupled together by routers 816. The routers 816 read address information in a received packet and determine the packet's destination. If the router decides that a different data center contains a host server computer, then the packet is forwarded to that data center. If the packet is addressed to a host in the data center 810, then it is passed to a network address translator (NAT) 818 that converts the packet's public IP address to a private IP address. The routers 816 or 820 can implement replication technology 825, such as port mirroring, wherein DNS requests to the DNS server 130 can be detected and replicated for sending to the monitoring service 140. The NAT also translates private addresses to public addresses that are bound outside of the datacenter 810. Additional routers 820 can be coupled to the NAT to route packets to one or more racks of host server computers 830. Each rack 830 can include a switch 832 coupled to multiple host server computers. A particular host server computer is shown in an expanded view at 840.

Each host 840 has underlying hardware 850 including one or more CPUs, memory, storage devices, etc. Running a layer above the hardware 850 is a hypervisor or kernel layer 860. The hypervisor or kernel layer can be classified as a type 1 or type 2 hypervisor. A type 1 hypervisor runs directly on the host hardware 850 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 870 can be part of the hypervisor or separated therefrom and generally includes device drivers needed for accessing the hardware 850. The partitions 880 are logical units of isolation by the hypervisor. Each partition 880 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Instances running on the partitions 880 can generate the DNS traffic data by initiating the DNS lookup requests to the DNS server 130.

Figure 9:
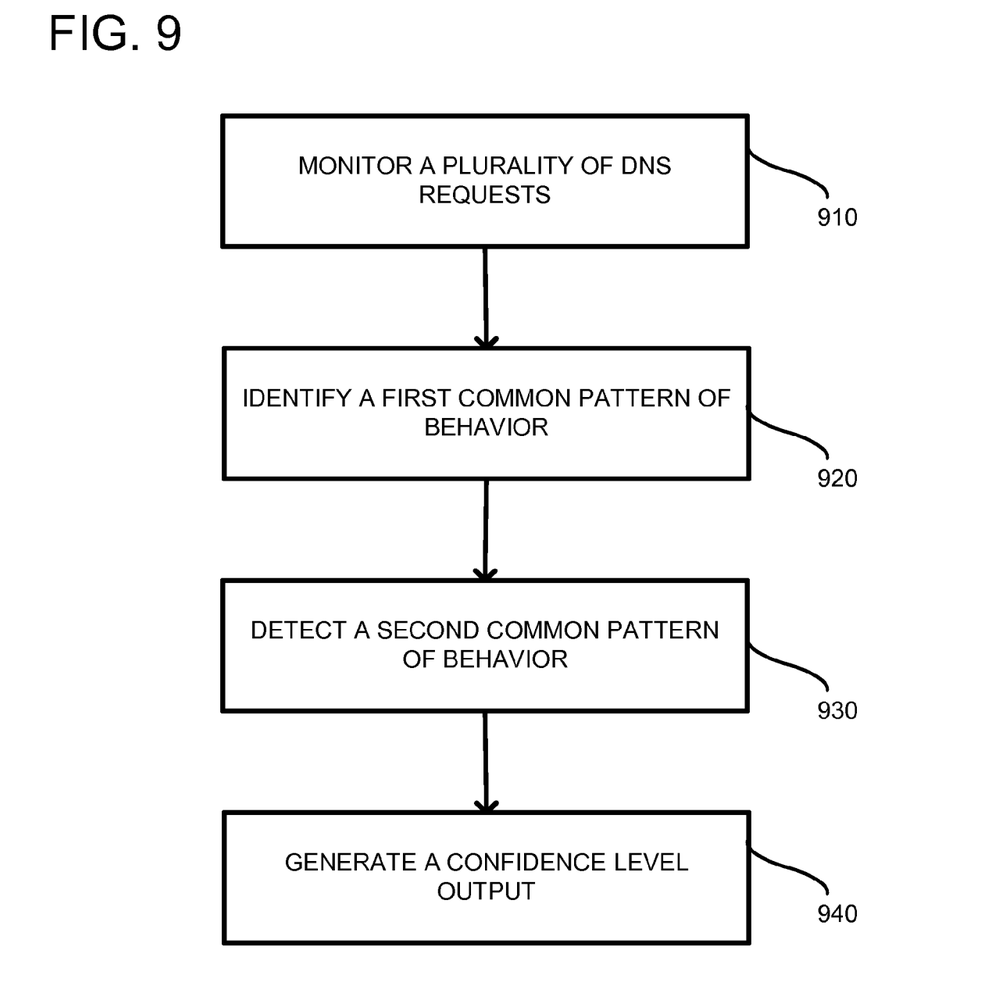
FIG. 9 is a flowchart of a method for detecting malicious software according to one embodiment.

FIG. 9 is a flowchart of a method for detecting malicious software according to one embodiment. In process block 910, a plurality of DNS requests and/or responses can be monitored by detecting and storing the same, such as is accomplished by the monitoring station or directly by the DNS-analysis engine, as described herein. The DNS requests and responses can be stored in a database for access by the DNS-analysis engine. In process block 920, a first common pattern of behavior can be identified. The common pattern of behavior is across multiple host server computers or instances running on the host server computers. An example of a common pattern can be that the two or more DNS requests occur for the same domain name and/or at regular time intervals of re-occurrence (e.g., once every hour). The first common pattern of behavior can be independent of known domain names associated with malicious software. Thus, a blacklist comparison between the requested domain name and names on the blacklist need not be performed. For DNS requests that have the first common pattern of behavior, in process block 930, a second common pattern of behavior can be detected. The second common pattern of behavior can be separate and independent from the first common pattern of behavior. Examples of the second common pattern of behavior can be, for example, analyzing each domain name for a statistical probability of randomness. Determining whether something is statistically random is well-understood in the art. A sequence of numbers, letter, and symbols can be statistically random when there are no recognizable patterns or regularities. Any desired tests can be used to determine whether something is statistically random can be used. Additionally, weighted inputs from the policy store 160 can be used as parameters for fine tuning the tests. Another common pattern of behavior can be whether a threshold percentage of DNS requests are unresolved. Malicious software can make a plurality of requests within a predetermined period of time, and a percentage of those requests are unresolvable by the DNS server, such that it cannot find an IP address associated with the domain name. A plurality of unresolvable requests is a typically pattern of behavior made by malicious software as it searches for a command and control server. In process block 940, if both the first common pattern of behavior and the second common pattern of behavior are detected, then a confidence level output can be generated indicating a percentage likelihood that malicious software has been found. The output can be in a variety of forms, such as a displayable output, a file, etc.

Figure 10:
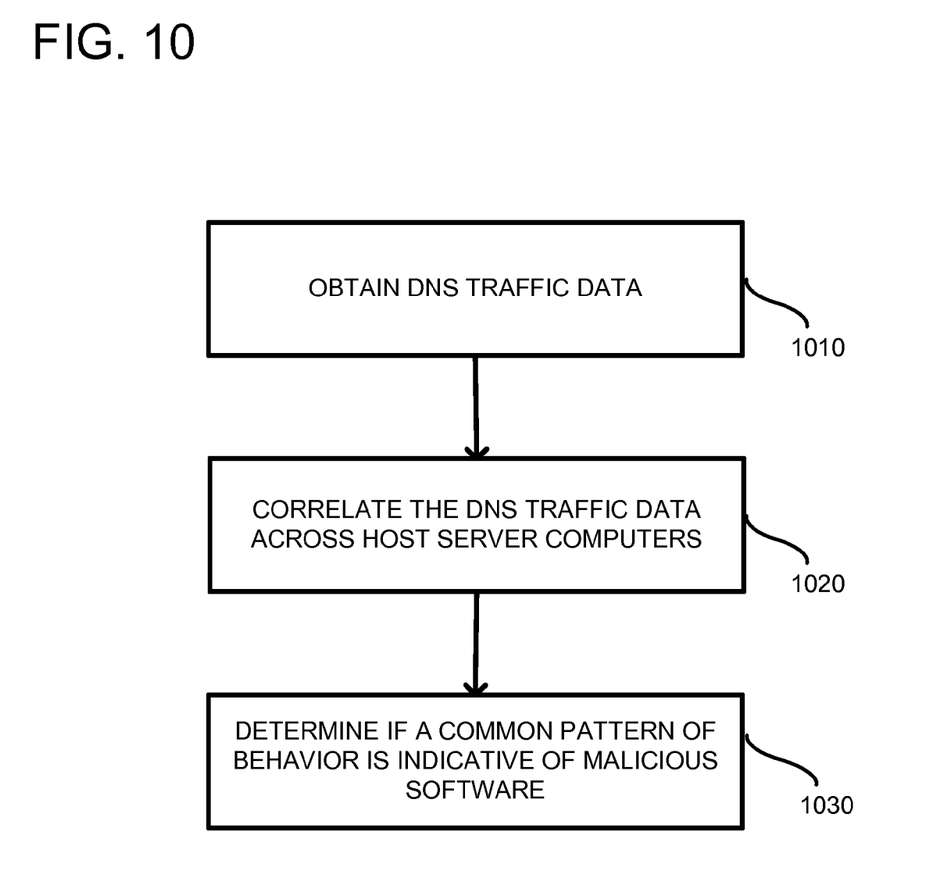
FIG. 10 is a flowchart of a method for detecting malicious software according to another embodiment.

FIG. 10 is a flowchart of a method for detecting malicious software. In process block 1010, DNS traffic data can be obtained, such as by retrieving the data from a database, or receiving the data directly. For example, in FIG. 1, the DNS traffic data can be obtained by the DNS-analysis engine 110 through reading of the database 150. In other embodiments, the engine 110 can obtain the DNS requests directly, such as is shown in FIG. 3. In any event, the DNS traffic data, which can include requests and responses, can be available to the engine for analysis. In process block 1020, the DNS traffic data can be correlated across host server computers. Correlation can be, for example, a frequency correlation, such as can be detected in FIG. 5. Other correlations can be used to indicate multiple instances and/or host server computers are making the same or highly similar DNS requests. In process block 1030, a common pattern of behavior indicative of malicious software can be determined. Once a correlation is found in process block 1020, a wide variety of common patterns of behavior can be used. For example, a determination can be made whether the domain names are statistically random. Alternatively, a check can be made whether the domain names are on a blacklist of known malicious names. Another possible option is that a percentage of lookups are not resolvable. Still another possible option is that a response includes a text message and the text message itself is statistically random. Any one or more of these alternative options can be used in order to determine if a common pattern of behavior exists. The results can be in terms of a probability that the detection is of malicious software and such results can be output as a confidence level.

Figure 11:
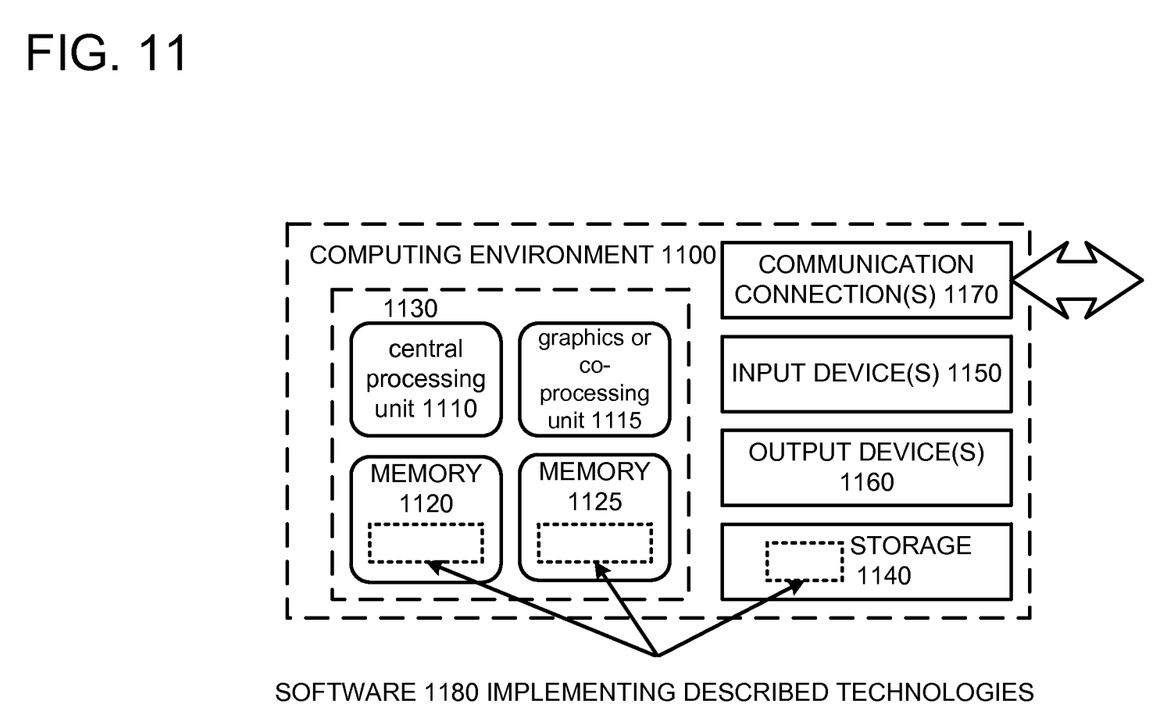
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. For example, the DNS-analysis engine can be the software 1180 executed from the memory 1120.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, although detection of malicious software is described as correlating DNS requests across host server computers, the methods described herein can also be used to detect a single instance of malicious software.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of detecting malicious software, comprising:
monitoring a plurality of Domain Name System (DNS) requests from host server computers in a multi-tenant environment;
using a monitoring server computer in the multi-tenant environment, identifying a first common pattern of behavior of the DNS requests across multiple of the host server computers, the first common pattern of behavior that is independent of domain lookup including correlating at least two of the multiple host server computers to determine if they are making a plurality of same DNS requests at periodic intervals, which is indicative of malicious software being present on the host server computers and attempting to contact a command-and-control server;
for DNS requests that have the identified first common pattern of behavior that is independent of domain lookup, detecting at least a second pattern of behavior associated with the DNS requests, wherein the detecting the second pattern of behavior includes analyzing each domain name for statistical probability of randomness including an analysis of how numbers are placed within the domain names; and generating a confidence level output associated, at least in part, with the detection of the at least second pattern of behavior as a weighted parameter, which is indicative of DNS requests being generated from malicious software.

2. The method of claim 1, wherein the first common pattern of behavior is independent of known names associated with the malicious software.

3. The method of claim 1, wherein the detecting the second pattern of behavior further includes analyzing that a threshold percentage of DNS requests are unresolved.

4. The method of claim 1, wherein the first common pattern of behavior and the second pattern includes at least one of the following: the DNS requests are for a same domain name at regular intervals, or the second pattern includes a threshold percentage of DNS requests that are unresolved.

5. A computer-readable storage, which is nonvolatile storage, including instructions thereon for executing a method of detecting that malicious software is present on host server computers, comprising:

obtaining, using a monitoring server computer, Domain Name System (DNS) traffic data between a DNS server and a plurality of host server computers;

correlating the DNS traffic data across the host server computers or virtual machines on the same host server computer for at least one common pattern of behavior of transmitting DNS requests that is independent of domain lookup; and for the correlated DNS traffic data that is independent of domain lookup, determining if the at least one common pattern of behavior is indicative of malicious software, wherein correlating includes a first-level determination of identifying that a frequency of DNS requests occurs at regular intervals and, wherein determining includes a second-level determination including a weighted calculation using a percentage of unresolved lookups and a probability of statistically random domain names, which includes a determination of how numbers are placed throughout the domain names.

6. The computer-readable storage of claim 5, wherein correlating the frequency includes storing a first time associated with a first DNS request from a first host server computer, storing a second time associated with a second DNS request from the first host server computer, and calculating a difference between the first and second time to obtain a frequency.

7. The computer-readable storage of claim 5, wherein the weighted calculation includes a parameter associated with whether the domain name is on a predetermined list of domain names.

8. The computer-readable storage of claim 5, wherein the weighted calculation includes a parameter associated with whether a predetermined percentage of DNS lookups are not resolved.

9. The computer-readable storage of claim 5, further including analyzing a response of the DNS requests to determine if the response includes a text message and determining whether the text message is statistically random.

10. The computer-readable storage of claim 5, further including generating a confidence level output indicating the detected pattern across the DNS requests has been determined.

11. The computer-readable storage of claim 5, wherein the plurality of host computers are in a multi-tenant environment, and wherein determining if the common pattern is indicative of malicious software includes determining if the pattern occurs from at least two different tenants.

12. The computer-readable storage of claim 5, wherein obtaining DNS traffic data includes retrieving the DNS traffic data from a monitoring service, which obtains the DNS traffic data at fixed intervals.

13. The computer-readable storage of claim 5, wherein the determining if the pattern is indicative of malicious software includes determining if the same domain name is a statistically random name.

14. The computer-readable storage of claim 13, further including receiving weights into an engine that determines if the domain name is statistically random.

15. A computer-readable storage, which is nonvolatile, including instructions thereon for executing a method of detecting that malicious software is present on host server computers, comprising:

monitoring a plurality of Domain Name System (DNS) requests from the host server computers in a multi-tenant environment;

correlating DNS requests across tenants or across software instances from a same tenant by determining if the DNS requests have a same time frequency in which they re-occur;

for correlated DNS requests that have the same frequency, determining whether the DNS requests have one or more of the following characteristics: the DNS requests are statistically random, the DNS requests include a domain name that is on a blacklist of known corrupted DNS domain names; or the DNS requests exceed a predetermined percentage of requests that are not resolvable; and for responses to the DNS requests, determining if at least one response includes a text message and analyzing whether the text message is statistically random, which includes analyzing how numbers are placed throughout the domain name.

16. The computer-readable storage of claim 15, further including generating a confidence level output associated, at least in part, with the determining that the at least one response includes the text message, which is indicative of DNS requests being generated from malicious software.

17. The computer-readable storage of claim 15, wherein correlating DNS requests includes identifying multiple tenants or multiple instances in the same tenant that are making a same DNS request.

18. A system for detecting malicious software present on one or more computers, comprising:

two or more host computers for executing virtual machines in a multi-tenant environment;

a Domain Name System (DNS) server computer coupled to the two or more host computers;

a DNS-analysis engine coupled to the DNS server for correlating patterns of behavior associated with DNS requests from the two or more host computers indicative of malicious software; and the DNS-analysis engine further for analyzing a response to at least one of the DNS requests to determine if the response includes a text message that is statistically random, wherein the determination of whether the response includes a text message that is statistically random includes determining how numbers are placed through the text message.

* * * * *